United States Patent
Hillan

(10) Patent No.: US 11,791,866 B2
(45) Date of Patent: Oct. 17, 2023

(54) SYSTEMS AND METHODS FOR DEVICE COEXISTENCE

(71) Applicant: QUALCOMM Incorporated, San Diego, CA (US)

(72) Inventor: John Hillan, Alton (GB)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 16/273,026

(22) Filed: Feb. 11, 2019

(65) Prior Publication Data

US 2020/0106482 A1  Apr. 2, 2020

Related U.S. Application Data

(60) Provisional application No. 62/739,652, filed on Oct. 1, 2018.

(51) Int. Cl.
*H04B 5/00* (2006.01)
*G06K 7/10* (2006.01)

(52) U.S. Cl.
CPC ....... *H04B 5/0031* (2013.01); *G06K 7/10059* (2013.01); *G06K 7/10227* (2013.01); *H04B 5/0056* (2013.01)

(58) Field of Classification Search
CPC .. H04B 5/0031; H04B 5/0056; H04B 5/0037; G06K 7/10227; G06K 7/10059
See application file for complete search history.

(56) References Cited

U.S. PATENT DOCUMENTS

| 9,887,743 | B2 | 2/2018 | Hillan et al. |
| 2008/0204194 | A1* | 8/2008 | Haar ............... G06K 7/0008 340/10.1 |
| 2012/0034590 | A1* | 2/2012 | Hallsten ............... G09B 7/00 434/351 |
| 2014/0120833 | A1* | 5/2014 | Hillan ............... G06K 7/10297 455/41.1 |
| 2015/0024683 | A1* | 1/2015 | Hussain ............ G06K 7/10039 455/41.1 |
| 2015/0280789 | A1* | 10/2015 | Hussain ............... H04B 5/0056 455/41.1 |
| 2016/0094325 | A1* | 3/2016 | Liu ................... H04L 23/02 370/329 |

FOREIGN PATENT DOCUMENTS

CN 101185085 A 5/2008

OTHER PUBLICATIONS

International Search Report and Written Opinion—PCT/US2019/046638—ISA/EPO—dated Nov. 13, 2019.

* cited by examiner

*Primary Examiner* — Yuwen Pan
*Assistant Examiner* — Fatuma G Sherif
(74) *Attorney, Agent, or Firm* — Patterson & Sheridan LLP

(57) ABSTRACT

A near-field communication (NFC) device is described. The NFC device includes an antenna configured to radiate an electromagnetic field. The NFC device also includes electronic circuitry coupled to the antenna. The electronic circuitry is configured to receive first data from a unidirectional tag device within a transmission limit. The electronic circuitry is also configured to receive second data from at least one bidirectional tag device after the transmission limit.

14 Claims, 9 Drawing Sheets

SYSTEMS AND METHODS FOR DEVICE COEXISTENCE

RELATED APPLICATIONS

This application is related to and claims priority to U.S. Provisional Patent Application Ser. No. 62/739,652 filed Oct. 1, 2018, for "SYSTEMS AND METHODS FOR DEVICE COEXISTENCE."

TECHNICAL FIELD

The present disclosure relates generally to wireless communications. More specifically, the present disclosure relates to systems and methods for device coexistence.

BACKGROUND

Advances in technology have resulted in smaller and more powerful computing devices. For example, computing devices, including wireless communication devices, have become prevalent. Wireless communication devices may communicate with other devices through wireless signaling. Some wireless communication devices enable communications using a variety of frequencies and applicable coverage areas, such as cellular communications, wireless local area network (WLAN) communications, near-field communication (NFC), etc.

In some cases, communications from different devices may interfere. As can be observed, techniques that reduce or avoid interference may be beneficial.

SUMMARY

A near-field communication (NFC) device is described. The NFC device includes an antenna configured to radiate an electromagnetic field. The NFC device also includes electronic circuitry coupled to the antenna. The electronic circuitry is configured to receive first data from a unidirectional tag device within a transmission limit. The electronic circuitry is also configured to receive second data from at least one bidirectional tag device after the transmission limit.

The NFC device may be a reader/writer device. The electronic circuitry may be configured to perform modulation detection for the unidirectional tag device during a guard time for the bidirectional tag device.

The transmission limit may be a threshold number of transmissions. The transmission limit may be a threshold period of time. The threshold period of time may be less than or equal to a guard time of the NFC device.

The electronic circuitry may be configured to determine whether the unidirectional tag device is transmitting after the transmission limit. The electronic circuitry may also be configured to send a command in response to determining that the unidirectional tag device is not transmitting after the transmission limit. The electronic circuitry may be configured to receive the data from the bidirectional tag device in response to sending the command.

The electronic circuitry may be configured to determine whether the received data from the unidirectional tag device is target data. The electronic circuitry may also be configured to discard the received data from the unidirectional tag device in response to determining that the received data from the unidirectional tag device is not target data.

A method performed by a near-field communication (NFC) device is also described. The method includes radiating an electromagnetic field. The method also includes receiving data from a unidirectional tag device within a transmission limit. The method further includes receiving data from a bidirectional tag device after the transmission limit.

A non-transitory tangible computer-readable medium storing computer executable code is also described. The computer-readable medium includes code for causing an electronic device to radiate an electromagnetic field. The computer-readable medium also includes code for causing the electronic device to receive data from a unidirectional tag device within a transmission limit. The computer-readable medium further includes code for causing the electronic device to receive data from a bidirectional tag device after the transmission limit.

An apparatus is also described. The apparatus includes means for radiating an electromagnetic field. The apparatus also includes means for receiving data from a unidirectional tag device within a transmission limit. The apparatus further includes means for receiving data from a bidirectional tag device after the transmission limit.

A near-field communication (NFC) device is also described. The NFC device includes an antenna configured to receive power for the NFC device when exposed to an electromagnetic field. The NFC device also includes electronic circuitry coupled to the antenna. The electronic circuitry is configured to transmit data. The electronic circuitry is also configured to determine when a transmission limit is reached. The electronic circuitry is further configured to stop transmitting data in response to determining that the transmission limit is reached. The NFC device may be a unidirectional tag.

The transmission limit may be a threshold number of transmissions. The transmission limit may be a threshold period of time. The threshold period of time may be less than or equal to a guard time of a reader/writer device.

DETAILED DESCRIPTION

Figure 1:
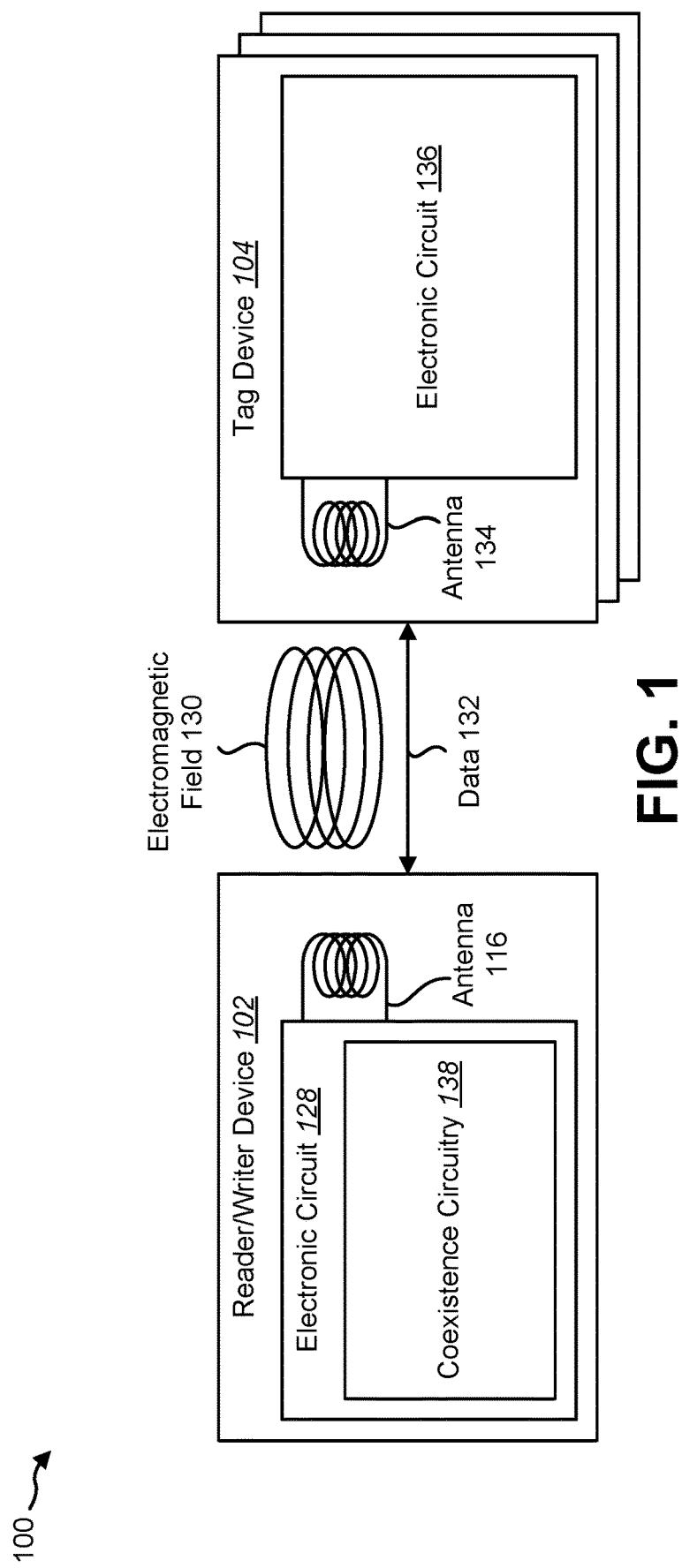
FIG. 1 is a block diagram illustrating one configuration of inductively coupled communication in a wireless communication system.

The detailed description set forth below in connection with the appended drawings is intended as a description of configurations and/or implementations of the disclosure and is not intended to represent the only configurations and/or implementations in which the disclosure may be practiced. Some examples of configurations and/or implementations are given herein, and should not necessarily be construed as preferred or advantageous over other configurations and/or implementations. The detailed description includes specific details for the purpose of providing a thorough understanding of the configurations and/or implementations of the disclosure. In some instances, some devices are shown in block diagram form.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Some configurations of the systems and methods disclosed herein may relate to near-field communication (NFC) tag talks first (TTF) devices with improved compatibility with bidirectional tags. Some NFC tags are bidirectional in nature, in that in the presence of a suitable radio frequency (RF) field (e.g., an RF field at approximately 13.56 megahertz (MHz)), the tags may wait for a command from a polling device before responding by modulating the field. Another kind of tag may start transmitting data (e.g., tag contents) whenever in the presence of a suitable RF field. This kind of tag may be referred to as a tag talks first (TTF) or unidirectional tag. In some examples, TTF or unidirectional tags may not include a receiver.

While TTF tags may have some advantages, some examples of TTF tags may not support collision detection. Because TTF tags may periodically repeat transmissions by modulating the RF field without reference to any external protocol, TTF tags may make communication with other tags (e.g., bidirectional tags) in the field difficult or even impossible. In some approaches, TTF tag transmission may not be deactivated, even by performing a field reset. For example, a unidirectional tag will modulate the RF field periodically as long as the field is present in some approaches.

Some configurations of the systems and methods disclosed herein may include a tag (e.g., a variant of a TTF tag or a modified TTF tag) that sends data by modulating the RF field for a limited time, and then discontinues sending data. In some examples, the tag may utilize a one-shot approach, where the tag only sends the data once each time the tag is in the presence of a suitable RF field. Other examples may include allowing one, two, or another number of transmissions (e.g., retransmissions), and/or the tag may be allowed to transmit any number of times within a fixed time interval.

One benefit of some configurations of the systems and methods disclosed herein is that improvements to tag functionality may be realized while having little or no impact on the use case of a single TTF tag. For example, a polling device may still find the tag, and would still receive the tag data (e.g., contents). If the data does not get transferred successfully, removing the tag from the field and reinserting the tag may cause a retransmission. In some configurations, the systems and methods disclosed herein may include a type of TTF tag that would allow technology detection to continue even with the detection of a TTF tag, and for a polling device to index all tags in the field and make a decision about which (if any) the polling device will communicate with further.

Another benefit may be increased compatibility with other tags (e.g., bidirectional tags). In some approaches, a mechanism may be implemented by which TTF device discovery can be added to the NFC forum technology discovery process. For example, during a tag power-up time, a polling device may monitor an RF field that the polling device is generating for any modulation. If the polling device detects modulation, the polling device may determine that there is a TTF tag in the field. In some approaches, the polling device may stop polling for other devices. While these approaches may function for reading the content of the TTF device, these approaches may not provide a way to determine if there are any bidirectional tags in the field as well.

In some of the approaches described herein, for a tag (e.g., variant of the TTF tag or a modified TTF tag) that ceases to transmit after a given limit (e.g., number of transmissions and/or after a given time interval), a further improvement to a technology discovery process becomes possible. The polling device may monitor the RF field for modulation during the initial power-up phase, but if the polling device discovers the modulation, the polling device may have the option to continue generating the field long enough for the TTF transmission(s) to cease. After that point (e.g., a transmission limit), the polling device may send commands to bidirectional tags and receive responses without interference from the TTF device in the field. This solves a problem of compatibility between TTF tags and bidirectional tags.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1 is a block diagram illustrating one configuration of inductively coupled communication in a wireless communication system 100. The wireless communication system 100 may include a reader/writer device 102 and one or more tag devices 104. The reader/writer device 102 is an electronic device that is capable of reading data 132 from a tag device 104 and/or capable of writing data 132 to a tag device 104. Examples of reader/writer devices 102 include smart phones, card readers, card writers, scanners, etc. Examples of tag devices 104 include cards (e.g., credit cards, debit cards, security cards, etc.), labels, chips, integrated circuits, etc. The reader/writer device 102 may include an antenna 116 coupled to an electronic circuit 128. Each tag device 104 may include an antenna 134 coupled to an electronic circuit 136. During operation, the combination of two NFC devices (i.e., the reader/writer device 102 and tag device(s) 104) may behave like a transformer.

In some examples, a reader/writer device 102 and one or more tag devices 104 may operate according to near-field communication (NFC) protocols. NFC is an inductive coupling communication technology. The reader/writer device 102 and the tag device(s) 104 (e.g., NFC-capable devices) may be separated by a distance. An alternating current may pass through a primary coil (i.e., the reader/writer device antenna 116) and create an electromagnetic field 130 (which may also be referred to as a radio frequency (RF) field or radiated field). The electromagnetic field 130 may induce a current in the secondary coil (i.e., the tag device antenna 134). The tag device(s) 104 may use the electromagnetic field 130 transmitted by the reader/writer device 102 to power itself. The configuration and tuning the antennas 116, 134 may determine the coupling efficiency from one device to the other device.

In some configurations, the reader/writer device 102 and the tag device(s) 104 are configured according to a mutual resonant relationship. When the resonant frequency of the tag device(s) 104 and the resonant frequency of the reader/writer device 102 are very close, transmission losses between the reader/writer device 102 and the tag device(s) 104 are reduced or minimal when the tag device(s) 104 is/are located in the near-field of the radiated field.

In some examples, the antenna 116 of the reader/writer device 102 and/or the antenna 134 of the tag device(s) may be an NFC loop antenna. The NFC loop antenna may provide a means for energy transmission and reception. As stated, an efficient energy transfer may occur by coupling a large portion of the energy in the near-field of a reader/writer device antenna 116 to a tag device antenna 134 rather than propagating most of the energy in an electromagnetic wave to the far field.

In some examples, different types of tag devices 104 may be included in the wireless communication system 100. For example, one or more unidirectional tag devices and/or one or more bidirectional tag devices may be included in the wireless communication system 100. A bidirectional tag device may be a tag device 104 that receives a message (e.g., command) from a reader/writer device 102 before transmitting data 132. Additionally or alternatively, a bidirectional tag device may include a receiver. A unidirectional tag device may be a tag device 104 configured to transmit data 132 in one direction. For example, a unidirectional tag device may transmit data 132 without receiving a message (e.g., command) from a reader/writer device 102. For example, a unidirectional tag device may transmit data 132 when in proximity to the reader/writer device 102 (e.g., when exposed to the electromagnetic field 130). Additionally or alternatively, a unidirectional tag device may not include a receiver in some implementations. In some examples, a unidirectional tag device may be referred to as a TTF device.

A bidirectional tag device may obtain (e.g., receive) data 132 to allow for communications to be established. One form of communications that may be established is an International Standards Organization data exchange protocol (ISO-DEP) communication link. Another form of communications that may be established is NFC data exchange protocol (NFC-DEP). Communications between the NFC devices may be enabled over a variety of NFC radio frequency (RF) technologies, including but not limited to, NFC-A, NFC-B, NFC-F, NFC-V, etc.

In a case where a unidirectional tag device and a bidirectional tag device are both within the electromagnetic field, a coexistence issue may arise. If a unidirectional tag device continues to transmit, a reader/writer device 102 may be unable to establish a link with a bidirectional tag device.

In some configurations of the systems and methods disclosed herein, a unidirectional tag device may be configured to limit transmissions. For example, a unidirectional tag device 104 and/or the electronic circuit 136 may include transmission limit circuitry (not shown in FIG. 1). The transmission limit circuitry may be configured to limit transmissions to a transmission limit. A transmission limit may be a period of time and/or a limit on a number of transmissions. For example, a unidirectional tag device (e.g., one or more of the tag devices 104) may be configured to limit transmissions to a threshold number of transmissions and/or to a period of time. In some configurations, the transmission limit may be set in relation to the radiation of the electromagnetic field. For instance, the transmission limit may be set in relation to the start time of the electromagnetic field radiation or set in relation to an amount of time (e.g., 10 microseconds (μs), 50 μs, 100 μs, etc.) from the start time of the electromagnetic field radiation.

In some configurations, a reader/writer device 102 may be configured to detect and/or receive data 132 from one or more unidirectional tag devices within the transmission limit. For example, the reader/writer device 102 and/or the electronic circuit 128 may include coexistence circuitry 138. The coexistence circuitry 138 may be configured to manage coexistence between unidirectional tag(s) and bidirectional tag(s). The coexistence circuitry 138 may be implemented in hardware (e.g., integrated circuitry, as an application-specific integrated circuit (ASIC), controller, processor, etc.), and/or in a combination of hardware and software (e.g., a processor with instructions).

The coexistence circuitry 138 may enable reception from a unidirectional tag within the transmission limit and/or reception from a bidirectional tag after the transmission limit. In some configurations, the transmission limit may be a guard time (e.g., before sending command to a bidirectional tag device to send data), may be less than or equal to the guard time, and/or may correspond to the end of the guard time. For example, a reader/writer device 102 (e.g., coexistence circuitry 138) may control the electronic circuit 128 to receive data 132 from the unidirectional tag within the transmission limit and/or to wait until after a unidirectional tag has ceased transmissions to send a command to a bidirectional tag device.

A guard time may be a period of time in which the reader/writer device 102 does not send a command for a response from a bidirectional tag device (while radiating an electromagnetic field, for instance). The guard time may provide a bidirectional tag device time to power up from the electromagnetic field to prepare to receive a command. The guard time may start in relation to the radiation of the electromagnetic field. For instance, the guard time may start at the same time as the start time of the electromagnetic field radiation or within an amount of time (e.g., 10 μs, 50 μs, 100 μs, etc.) from the start time of the electromagnetic field radiation.

Figure 2:
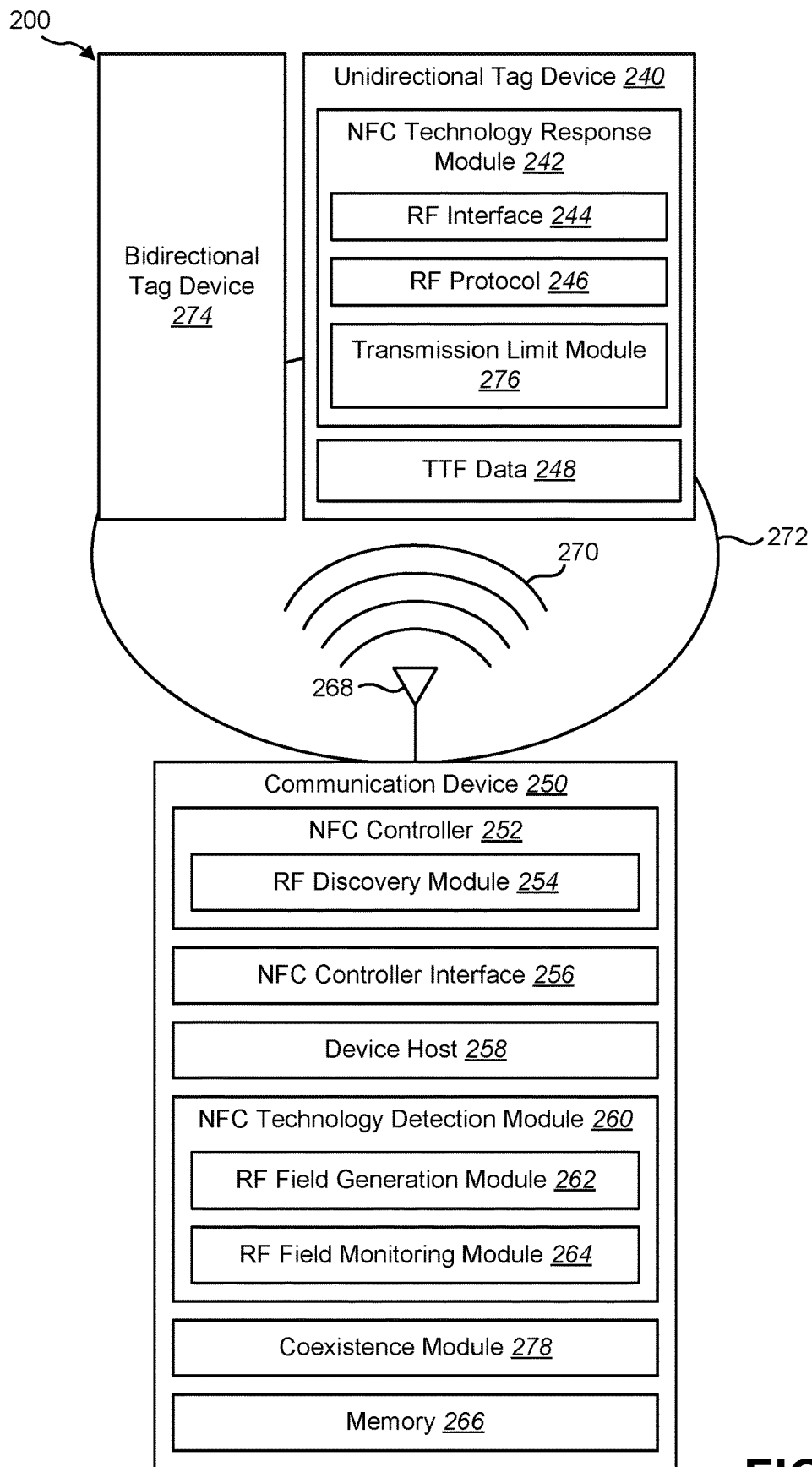
FIG. 2 is a block diagram illustrating an example of a communication network.

FIG. 2 is a block diagram illustrating an example of a communication network 200. The communication network 200 may be an example of the wireless communication system 100 described in connection with FIG. 1. The communication network 200 may include one or more communication devices 250, one or more bidirectional tag devices 274 and/or one or more unidirectional tag devices 240. One or more of the elements, components, modules, etc., described in connection with FIG. 2 may be implemented in hardware (e.g., circuitry) and/or a combination of hardware and software (e.g., a processor with instructions).

The communication device 250 may, through an antenna 268, communicate with a unidirectional tag device 240 and/or a bidirectional tag device 274 that is or are within an operating volume 272. For example, the communication device 250 may radiate an electromagnetic field 270 from the antenna 268 in the operating volume 272. The communication device 250 may be an example of the reader/writer device 102 described in connection with FIG. 1. In some configurations, the communication device 250 may use one or more NFC RF technologies (e.g., NFC-A, NFC-B, NFC-F, NFC-V, etc.).

In an aspect, the communication device 250 may use NFC technology detection module 260 to generate the electromagnetic field 270 (e.g., an RF field) in the operating volume 272 to attempt to detect the presence of and identify a unidirectional tag device 240 and/or poll for a bidirectional tag device 274. In an aspect, a unidirectional tag device 240 (e.g., a tag, a card, a peer target, etc.) may be configured to communicate in response to the presence of an electromagnetic field 270. For example, the unidirectional tag device 240 may be a TTF device. In an aspect, a unidirectional tag device 240 may be, but is not limited to, a tag, a reader/writer device, a peer initiator device, a remote peer target device, etc. In another aspect, a bidirectional tag device 274 may be configured to communicate in response to a command from the communication device 250.

The communication device 250 may include an NFC Controller Interface (NCI) 256. In an aspect, the NCI 256 may be configurable to enable communications between a device host (DH) 258 and an NFC Controller 252.

The communication device 250 may include an NFC Controller (NFCC) 252. In an aspect, the NFCC 252 may include an RF discovery module 254. The RF discovery module 254 may be configurable to perform RF discovery using a discovery process. One aspect of the discovery process may include polling for the presence of a remote NFC device. The DH 258 may be configurable to generate a command to prompt the NFCC 252 to perform various functions associated with RF discovery.

The communication device 250 may include an NFC technology detection module 260. The NFC technology detection module 260 may be configurable to detect the presence of and/or receive data from a unidirectional tag device 240 and/or a bidirectional tag device 274 within the operating volume 272. The NFC technology detection module 260 may include an RF field generation module 262 and an RF field monitoring module 264. In an aspect, the RF field generation module 262 may be configured to generate an unmodulated RF field in the operating volume 272 for a wait duration (e.g., a period of time). In an aspect, the wait duration may be defined as a guard time defined in the NFC forum specification. In another aspect, RF field generation module 262 may generate the unmodulated RF field for a wait duration defined by a TTF device. In still another aspect, the wait duration may be selected to be a longer duration of the NFC Forum defined guard time and a TTF device defined duration.

In response to the generated RF field, the unidirectional tag device 240 may send TTF data 248. For example, the unidirectional tag device 240 may include an NFC technology response module 242. The NFC technology response module 242 may respond to the electromagnetic field 270 (e.g., the generated RF field). For example, the NFC technology response module 242 may include an RF interface 244 and/or an RF protocol 246. The RF interface 244 may modulate the electromagnetic field 270 in accordance with an RF protocol 246 to send the TTF data 248. As used herein, TTF data may refer to any content available from a TTF device and where such content may be transmitted in response to the presence of a RF field, rather than waiting for a command to transmit.

In some configurations, the unidirectional tag device (e.g., NFC technology response module 242) may include a transmission limit module 276. The transmission limit module 276 may be configured to limit transmissions in accordance with a transmission limit. For example, the transmission limit module 276 may be configured to limit transmissions to a threshold number of transmissions and/or to a period of time after exposure to the electromagnetic field 270 (e.g., RF field). For instance, once the unidirectional tag device 240 is energized by the electromagnetic field 270, the transmission limit module 276 may count a number of times the TTF data 248 has been transmitted and/or may track an amount of time since the unidirectional tag device 240 was exposed to the electromagnetic field 270 (e.g., since entering the operating volume 272). When a threshold number of transmissions is reached and/or when a threshold amount of time is reached, the transmission limit module 276 may control the unidirectional tag device 240 (e.g., the NFC technology response module 242) to discontinue transmitting. In some configurations, the threshold amount of time may correspond to a guard period and/or wait duration. It should be noted that the transmission limit module 276 may be implemented as part of the NFC technology response module 242 or separate from the NFC technology response module 242.

In some configurations, the communication device 250 (e.g., the RF field monitoring module 264) may be configured to monitor the generated RF field for any load modulations that may be consistent with modulation characteristics of a NFC technology. In an aspect, the NFC technology may be NFC-A RF technology, NFC-B RF technology, NFC-F RF technology, NFC-V RF technology, etc. In an aspect, an NFC technology type that RF field monitoring module 264 monitors may be based on which NFC technology type the communication device 250 intends to use during subsequent communications in the technology detection process. In another aspect, the RF field monitoring module 264 may be configured to monitor for RF field modulations indicative of multiple NFC technology types. In another aspect, RF field monitoring module 264 may determine the RF field is being modulated once the load modulation increases above a threshold level. In some configurations, the NFC technology detection module 260 may receive TTF data 248 and communicate the TTF data 248 to one or more applications of interest. In an aspect, the NFC technology detection module 260 may communicate the received TTF data 248 by notifying an adjacent upper layer that the TTF data 248 (e.g., a frame) has been received. In another operational aspect, where RF field monitoring module 264 does not detect any RF field modulations during the wait duration, then NFC technology detection module 260 may continue with the technology detection process. Although FIG. 2 depicts NFC technology detection module 260 as a separate module, the functionality associated with NFC technology detection module 260 may be included within one or more components, such as but not limited to, the NFCC 252, the DH 258, etc.

The communication device 250 may include a coexistence module 278. The coexistence module 278 may be configured to manage coexistence between the bidirectional tag device 274 and the unidirectional tag device 240. The coexistence module 278 may be implemented in hardware (e.g., circuitry) and/or in a combination of hardware and software (e.g., a processor with instructions).

The coexistence module 278 may enable reception from the unidirectional tag device 240 within the transmission limit and/or reception from the bidirectional tag device 274 after the transmission limit. In some configurations, the transmission limit may be a guard time (e.g., before sending command to a bidirectional tag device 274 to send data), may be less than or equal to the guard time, and/or may correspond to the end of the guard time. For example, the communication device 250 (e.g., coexistence module 278) may control the communication device 250 to receive TTF data 248 from the unidirectional tag device 240 within the transmission limit and/or to wait until after the unidirectional tag device 240 has ceased transmissions to send a command to the bidirectional tag device 274.

The communication device 250 may include memory 266 that may be configurable to store received data and/or make received data available to one or more applications associated with the communication device 250. Accordingly, systems and methods are described for discovery of and/or communication with TTF devices.

As described above, a problem may arise when a unidirectional tag device 240 and a bidirectional tag device 274 are located in the same operating volume 272. For example, without a limit on communications from the unidirectional tag device 240, the communications (e.g., TTF data 248) sent from the unidirectional tag device 240 may interfere with and/or prevent communications with the bidirectional tag device 274. In accordance with some configurations of the systems and methods disclosed herein, the unidirectional tag device 240 may be configured to stop transmitting data in response to determining that a transmission limit is reached. The transmission limit may be a threshold number of transmissions and/or a threshold period of time. In some configurations, the threshold period of time may correspond to a guard time imposed on the communication device 250 (e.g., reader/writer device) by the time taken for a bidirectional tag to become ready for communication.

Figure 3:
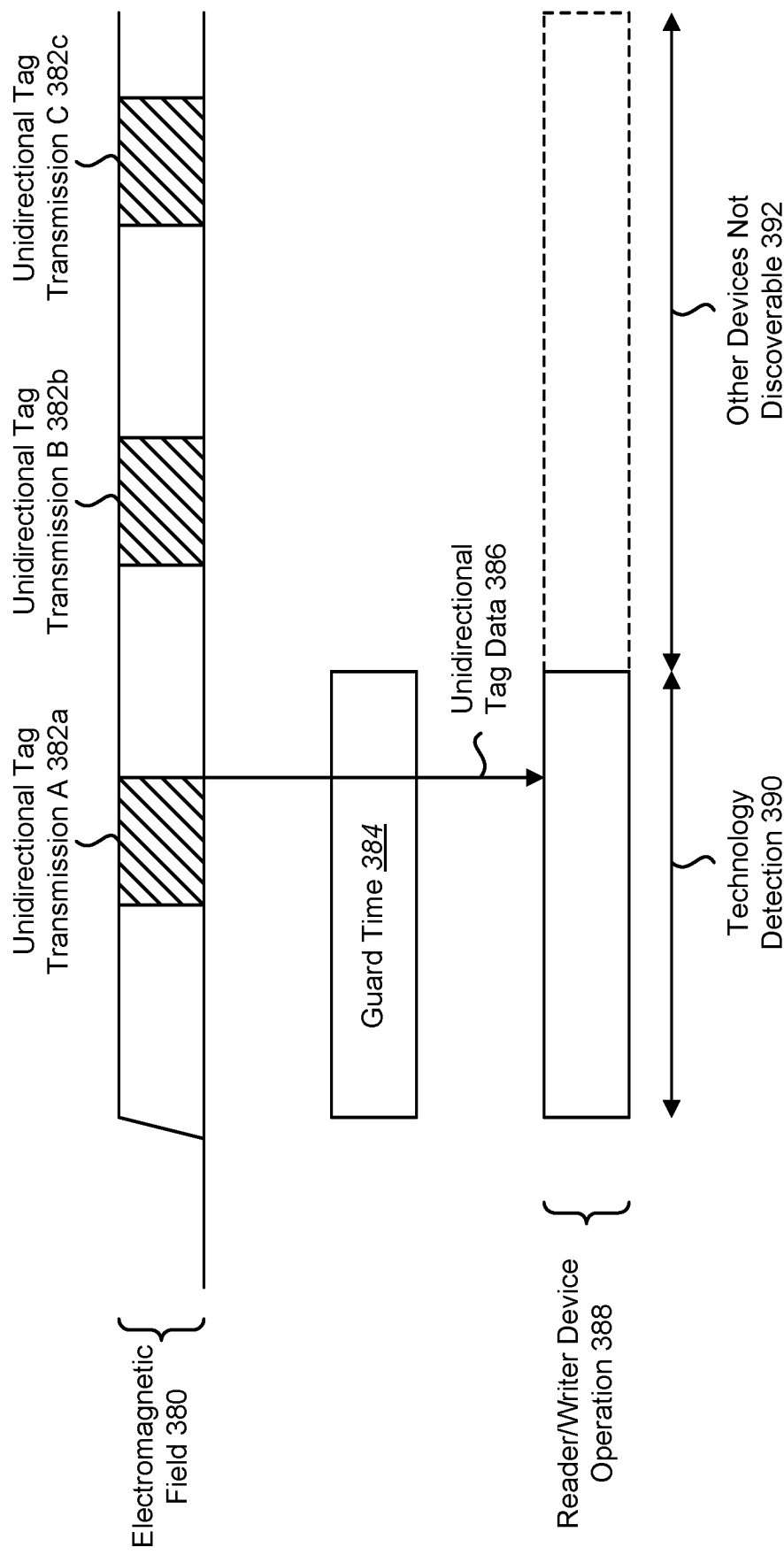
FIG. 3 is a diagram illustrating an example of a problem that may be caused by a unidirectional tag device without a transmission limit.

FIG. 3 is a diagram illustrating an example of a problem that may be caused by a unidirectional tag device without a transmission limit. Specifically, FIG. 3 illustrates an example of technology detection where a unidirectional tag device (e.g., TTF device) continues to transmit, which can result in only the unidirectional tag device being discovered. As can be observed, a reader/writer device may supply an electromagnetic field 380 (e.g., RF field) to a unidirectional tag device (e.g., TTF device) and one or more other bidirectional tag devices. As illustrated in FIG. 3, the unidirectional tag device may repeatedly send unidirectional tag transmissions (denoted unidirectional tag transmission A 382a, unidirectional tag transmission B 382b and unidirectional tag transmission C 382c) when exposed to the electromagnetic field 380. FIG. 3 also shows a timeline of reader/writer device operation 388. In some examples, a transmission of unidirectional tag data 386 may be sent during a guard time 384 and/or while technology detection 390 is being performed by the reader/writer device. Due to the repeated (e.g., unlimited) transmissions 382a-c from the unidirectional tag device, the one or more other bidirectional tag devices may not be discoverable 392. For example, the repeated transmissions 382a-c may interfere with potential communications with the bidirectional tag device(s).

Figure 4:
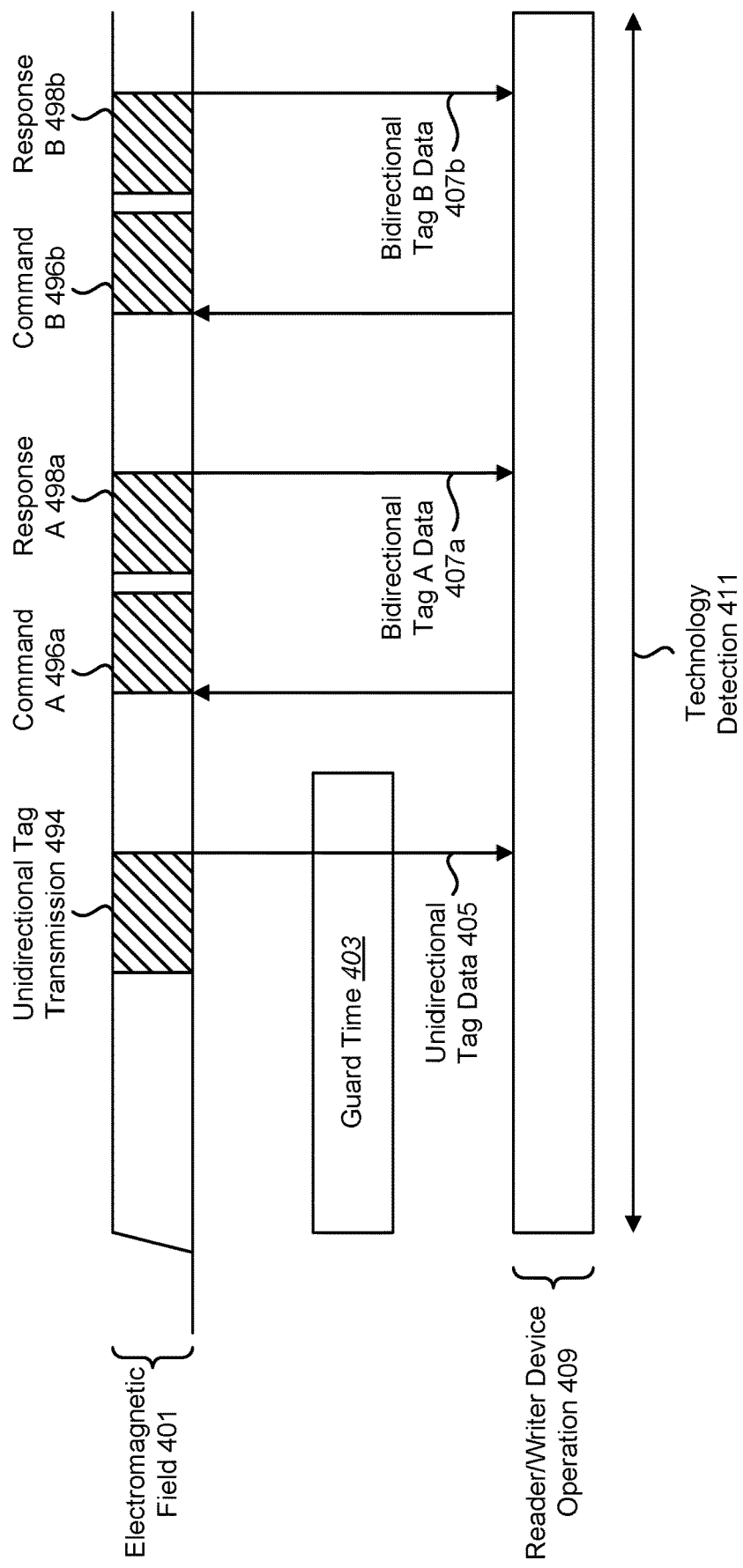
FIG. 4 is a diagram illustrating an example of communications of a reader/writer device, a unidirectional tag device, and bidirectional tag devices.

FIG. 4 is a diagram illustrating an example of communications of a reader/writer device, a unidirectional tag device, and bidirectional tag devices. Specifically, FIG. 4 illustrates an example of technology detection where a unidirectional tag ceases to transmit, allowing multiple devices to be discovered. In particular, FIG. 4 shows a timeline of reader/writer device operation 409. As can be observed, a reader/writer device may supply an electromagnetic field 401 to a unidirectional tag device (e.g., TTF device) and two bidirectional tag devices (bidirectional tag A and bidirectional tag B). In this example, the unidirectional tag device performs one unidirectional tag transmission 494 to send unidirectional tag data 405 once. The unidirectional tag data 405 may be sent during the guard time 403. For example, the unidirectional tag device may be limited to one transmission and/or may be limited to transmitting within a threshold period of time (e.g., the guard time, a period less than or equal to the guard time, etc.). The reader/writer device may continue to perform technology detection 411 after the guard time 403. For example, the reader/writer device may send command A 496a and receive response A 498a (e.g., bidirectional tag A data 407a) from bidirectional device A. The reader/writer device may send another command B 496b and receive a response B 498b (e.g., bidirectional tag B data 407b) from bidirectional device B. As can be observed, limiting unidirectional tag transmissions may permit the unidirectional tag device and the bidirectional tag devices to coexist without conflict.

Figure 5:
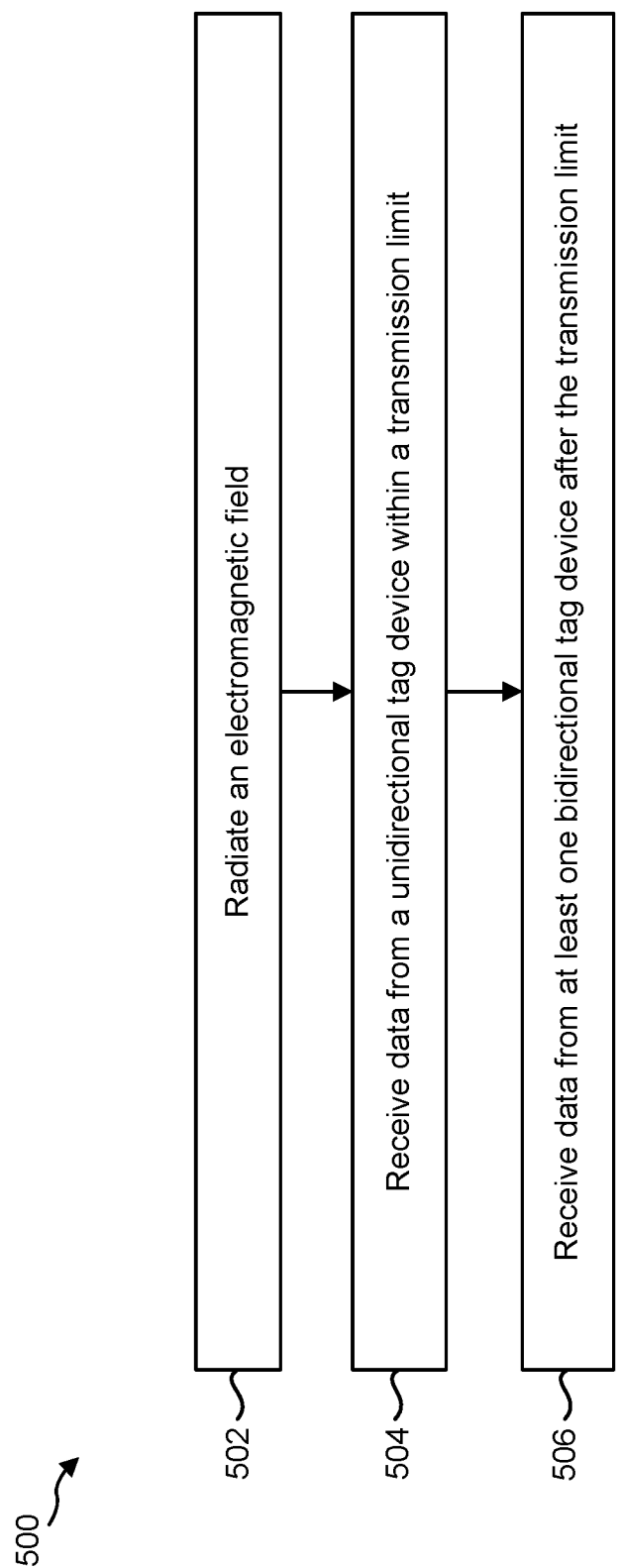
FIG. 5 is a flow diagram illustrating an example of a method for coexistence operation.

FIG. 5 is a flow diagram illustrating an example of a method 500 for coexistence operation. In some configurations, the method 500 may be performed by the reader/writer device 102 described in connection with FIG. 1 and/or the communication device 250 described in connection with FIG. 2. The reader/writer device 102 may radiate 502 an electromagnetic field. A unidirectional tag device and one or more bidirectional tag devices may be exposed to the electromagnetic field (e.g., may be energized by the electromagnetic field, may be within an operating volume of the electromagnetic field).

The reader/writer device 102 may receive 504 data from a unidirectional tag device within a transmission limit. For example, the reader/writer device 102 may receive 504 data (e.g., TTF data) from a unidirectional tag within a number of transmissions and/or within a threshold time (e.g., guard time, a period less than or equal to the guard time, etc.).

The reader/writer device 102 may receive 506 data from at least one bidirectional tag device after the transmission limit. For example, after the transmission limit, the reader/writer device 102 may send a command and receive a response (e.g., data) from at least one bidirectional tag device. The unidirectional tag device and the bidirectional tag device may be exposed to (e.g., within the operating volume of) the electromagnetic field at the same time.

Figure 6:
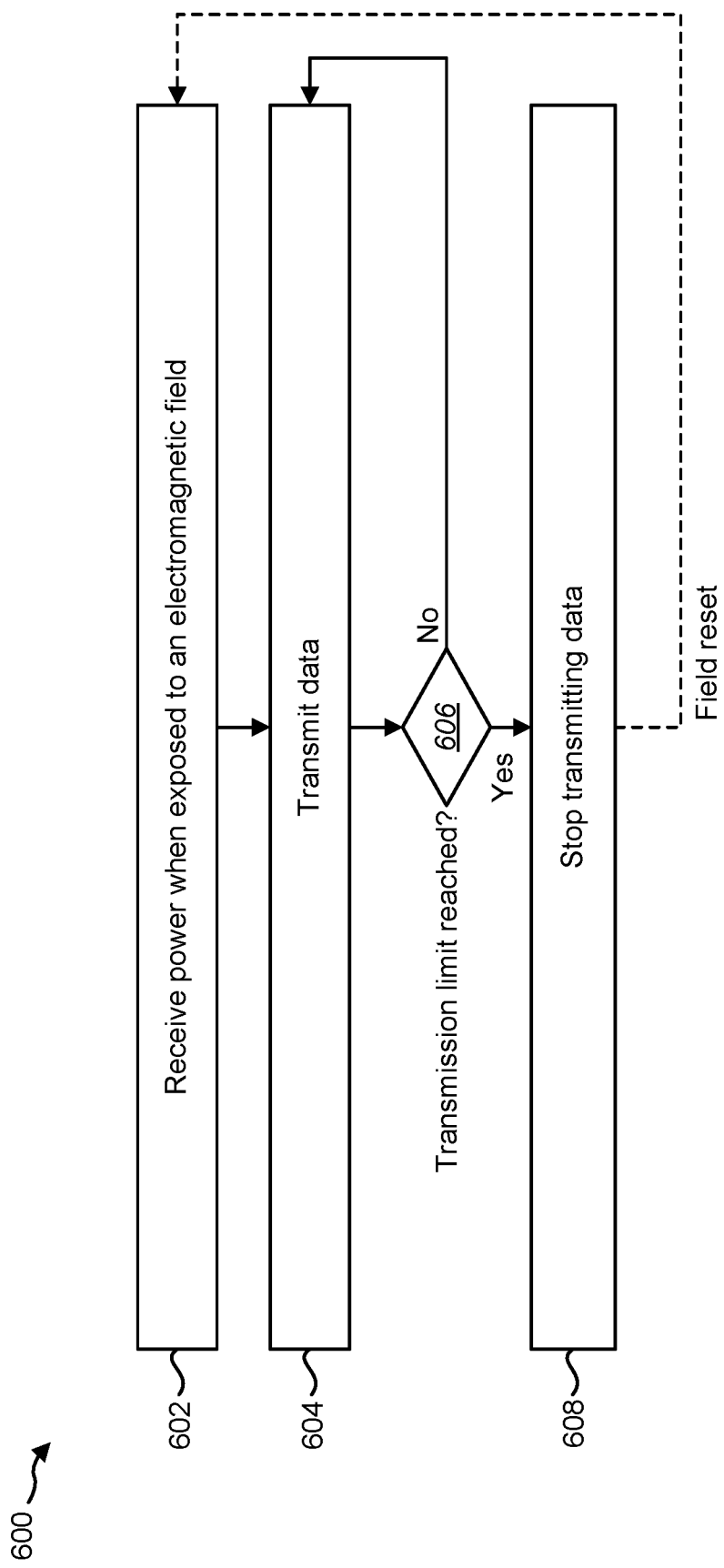
FIG. 6 is a flow diagram illustrating an example of another method for coexistence operation.

FIG. 6 is a flow diagram illustrating an example of another method 600 for coexistence operation. In some configurations, the method 600 may be performed by a tag device 104 (e.g., a unidirectional tag device) and/or the unidirectional tag device 240. The tag device 104 may receive 602 power (e.g., from an antenna to electronic circuitry) when exposed to an electromagnetic field. For example, an electromagnetic field may be radiated to the tag device 104 by a reader/writer device 102.

The tag device 104 may transmit 604 data. For example, the tag device 104 may transmit 604 data (e.g., TTF data) to a reader/writer device. For instance, the tag device 104 may modulate the electromagnetic field to transmit 604 the data.

The tag device 104 may determine 606 whether a transmission limit is reached. For example, the tag device 104 may determine whether a threshold number of transmissions have been performed and/or whether a threshold time limit is reached. In some configurations, the tag device 104 may include a counter (e.g., registers, processor with memory, etc.) that may count the number of transmissions performed. Additionally or alternatively, the tag device 104 may include a timer (e.g., a counter that counts a number of clock cycles). The number of transmissions may be compared to a threshold and/or the time may be compared to a threshold. In a case that the transmission limit is not reached, the tag device 104 may continue to transmit 604 data (e.g., may continue and/or repeat data transmission).

In a case that the transmission limit is reached, the tag device 104 may stop 608 transmitting data. For example, the tag device 104 may cease all transmissions. In some configurations, the tag device 104 may not transmit data again until after a field reset occurs (e.g., the tag device 104 is separated from the electromagnetic field and an electromagnetic field is reintroduced to the tag device 104).

Figure 7:
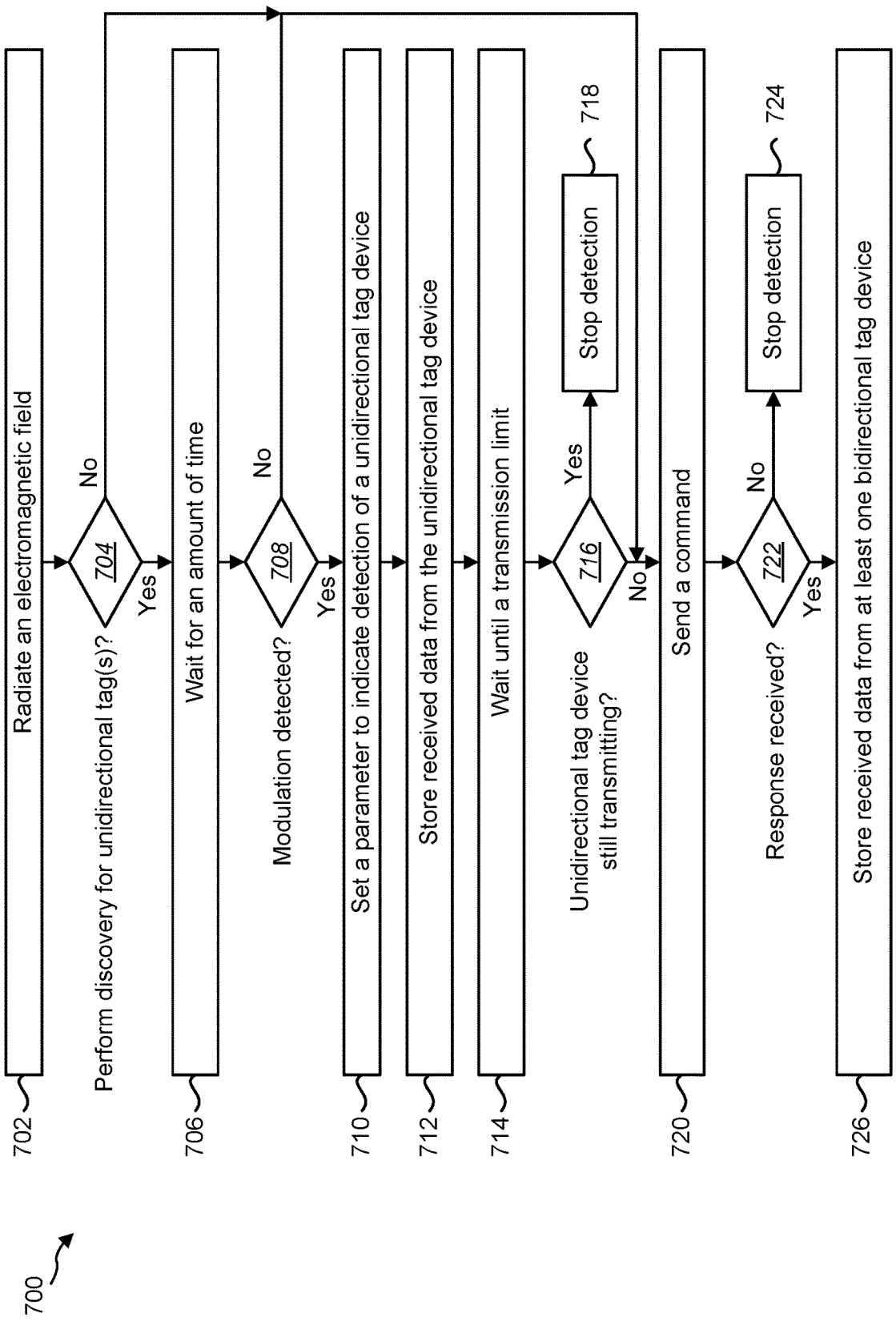
FIG. 7 is a flow diagram illustrating an example of another configuration of a method for coexistence operation.

FIG. 7 is a flow diagram illustrating an example of another configuration of a method 700 for coexistence operation. In some configurations, the method 700 may be performed by the reader/writer device 102 described in connection with FIG. 1 and/or the communication device 250 described in connection with FIG. 2. The reader/writer device 102 may radiate 702 an electromagnetic field. A unidirectional tag device and one or more bidirectional tag devices may be exposed to the electromagnetic field (e.g., may be energized by the electromagnetic field, may be within an operating volume of the electromagnetic field).

The reader/writer device 102 may determine 704 whether to perform discovery for unidirectional tag(s). For example, the reader/writer device 102 may determine whether to attempt to discover whether a unidirectional tag is in an operating volume. In some configurations, determining 704 whether to perform discovery for unidirectional tag(s) may be based on a setting. For example, the reader/writer device 102 may read a portion of memory that designates whether or not to perform unidirectional tag discovery. In an example, the memory may store the setting as a configuration parameter (e.g., "CON_POLL_TTF") that indicates a value (e.g., 1 or 0) of whether or not to perform unidirectional tag discovery. For example, the reader/writer device 102 may determine whether the configuration parameter is equal to 1 to determine 704 whether to perform discovery for a unidirectional tag. The setting may include additional or alternative information in some examples. In some configurations, the reader/writer device 102 may receive (via an input device and/or a user interface) an indicator of a setting value. For example, a user may or may not want the reader/writer device 102 to perform unidirectional tag discovery and may input the indicator (e.g., via a touchscreen, mouse, keypad, keyboard, button, microphone, etc.).

In some configurations, the reader/writer device 102 may additionally or alternatively determine whether to perform discovery based on an operating context. An operating context may be a context or mode in which the reader/writer device 102 is operating. For example, if the reader/writer device 102 is currently running an inventory scanning application that is only applicable to unidirectional tags, then the reader/writer device 102 may determine 704 to perform discovery for unidirectional tag(s). In another example, if the reader/writer device 102 is currently running a payment application that is only applicable to bidirectional tags, the reader/writer device 102 may determine 704 not to perform discovery of unidirectional tags. In some examples, the reader/writer device 102 may have an operational context in which both unidirectional and bidirectional tags may be discovered and/or in which it is unknown whether discovery of unidirectional or bidirectional tags is applicable. In some approaches, the reader/writer device 102 may determine 704 to perform discovery for unidirectional tag(s) in the cases in which it is unknown whether unidirectional tag discovery is applicable or in which both unidirectional tag discovery and bidirectional tag discovery are applicable.

In a case that the reader/writer device 102 determines 704 not to perform unidirectional tag discovery, the reader/writer device 102 may not perform detection for a period. For example, the reader/writer device 102 may not perform detection during a guard time. In some approaches, if the reader/writer device 102 determines 704 not to perform detection for a unidirectional tag, the reader/writer device 102 may discard any data received during the period (e.g., received during the guard time, received before the transmission limit).

In a case that the reader/writer device 102 determines 704 to perform unidirectional tag discovery, the reader/writer device 102 may wait 706 for an amount of time. The amount of time may be enough time for a unidirectional tag to modulate the electromagnetic field (e.g., enough time to energize and to send data). In some examples, the amount of time may be less or equal to the transmission limit (e.g., guard time).

The reader/writer device 102 may determine 708 whether modulation is detected. For example, the reader/writer device 102 may determine 708 whether the electromagnetic field has been modulated in order to receive data. For instance, detecting the modulation may include receiving data. For example, the reader/writer device 102 may receive data (e.g., TTF data) from a unidirectional tag within a number of transmissions and/or within a threshold time (e.g., guard time). In some configurations, the reader/writer device 102 may perform modulation detection for a unidirectional tag during a guard time for a bidirectional tag. In a case that no modulation is detected, the reader/writer device 102 may proceed to bidirectional tag device discovery and/or detection. For example, the reader/writer device 102 may skip one or more operations related to unidirectional tag detection and/or data storage. In some approaches, if no modulation is detected, the reader/writer device 102 may set a parameter indicating that no unidirectional tag was detected and/or that no unidirectional tag data was received.

In a case that modulation is detected (e.g., data is received from a unidirectional tag device), the reader/writer device 102 may set 710 a parameter to indicate detection of a unidirectional tag device. In some examples, the parameter may indicate to a higher layer process and/or an application that a unidirectional tag device was detected and/or that data was successfully received from the unidirectional tag device. For instance, an output parameter (e.g., "FOUND_TTF") may have a value (e.g., 1 or 0) indicating whether modulation from a unidirectional tag device is detected. In a case that modulation is detected, for example, the reader/writer device 102 may set 710 FOUND_TTF to 1.

The reader/writer device 102 may store 712 received data from the unidirectional tag device. For example, the reader/writer device 102 may write the received data from the unidirectional tag device to memory (e.g., RAM, magnetic disk, flash memory, optical disc, etc.). For instance, the reader/writer device 102 may store the received data to an output variable (e.g., "GRE_POLL_TTF"). In some configurations, the reader/writer device 102 may present the received data (or other information based on the received data) on a display.

The reader/writer device 102 may wait 714 until a transmission limit. For example, the reader/writer device 102 may wait until the transmission limit has expired (e.g., enough time for a unidirectional tag device to stop retransmitting). In some configurations, the reader/writer device 102 may maintain a timer from starting to radiate 702 the electromagnetic field. If the timer satisfies a transmission limit threshold (e.g., is greater than or equal to the transmission limit threshold), then the reader/writer device 102 may determine that the wait 714 is completed. Additionally or alternatively, the reader/writer device 102 may wait for an assumed and/or detected number of unidirectional tag transmissions. For example, the reader/writer device 102 may wait for 3 (assumed or detected) transmissions with a 1 millisecond (ms) cycle (e.g., 3 ms). Other numbers of transmissions with other cycles may be utilized.

The reader/writer device 102 may determine 716 whether a unidirectional tag device is still transmitting. For example, the reader/writer device 102 may determine 716 whether the unidirectional tag device has continued (e.g., repeated) transmission(s) after the transmission limit. In some approaches, the reader/writer device 102 may perform modulation detection after the transmission limit (and before sending a command for any bidirectional tag device, for example) to determine 716 whether the unidirectional tag device has continued to repeat transmissions. In a case that the unidirectional tag device is still transmitting (e.g., does not cease retransmitting), the reader/writer device 102 may stop 718 detection (after waiting 714, for instance). For example, the reader/writer device 102 may not perform further detection procedures for a time (e.g., for a reset period), until a field reset occurs and/or until an input is received indicating to restart detection. Stopping 718 detection in this scenario (in a case whether a unidirectional tag continues to transmit) may be beneficial in that additional resources (e.g., energy, processing, etc.) are not expended when further detection would be unlikely due to interference from the unidirectional tag device.

In a case that the unidirectional device is not still transmitting, the reader/writer device 102 may send 720 a command. For example, the reader/writer device 102 may send a command via the electromagnetic field that requests a response from a bidirectional tag device.

The reader/writer device 102 may determine 722 whether a response is received. For example, the reader/writer device 102 may perform modulation detection to determine whether a bidirectional tag device has responded to the command. In a case that no response is received, the reader/writer device 102 may stop 724 detection. For example, the reader/writer device 102 may not attempt further detection for a time (e.g., for a reset period), until a field reset occurs and/or until an input is received indicating to restart detection.

In a case that a response is received, the reader/writer device 102 may store 726 received data from at least one bidirectional tag device. For example, the reader/writer device 102 may write the received data from the bidirectional tag device to memory (e.g., RAM, magnetic disk, flash memory, optical disc, etc.). In some configurations, the reader/writer device 102 may present the received data (or other information based on the received data) on a display. The unidirectional tag device and the bidirectional tag device may be exposed to (e.g., within the operating volume of) the electromagnetic field when the data from the bidirectional tag device is received.

Figure 8:
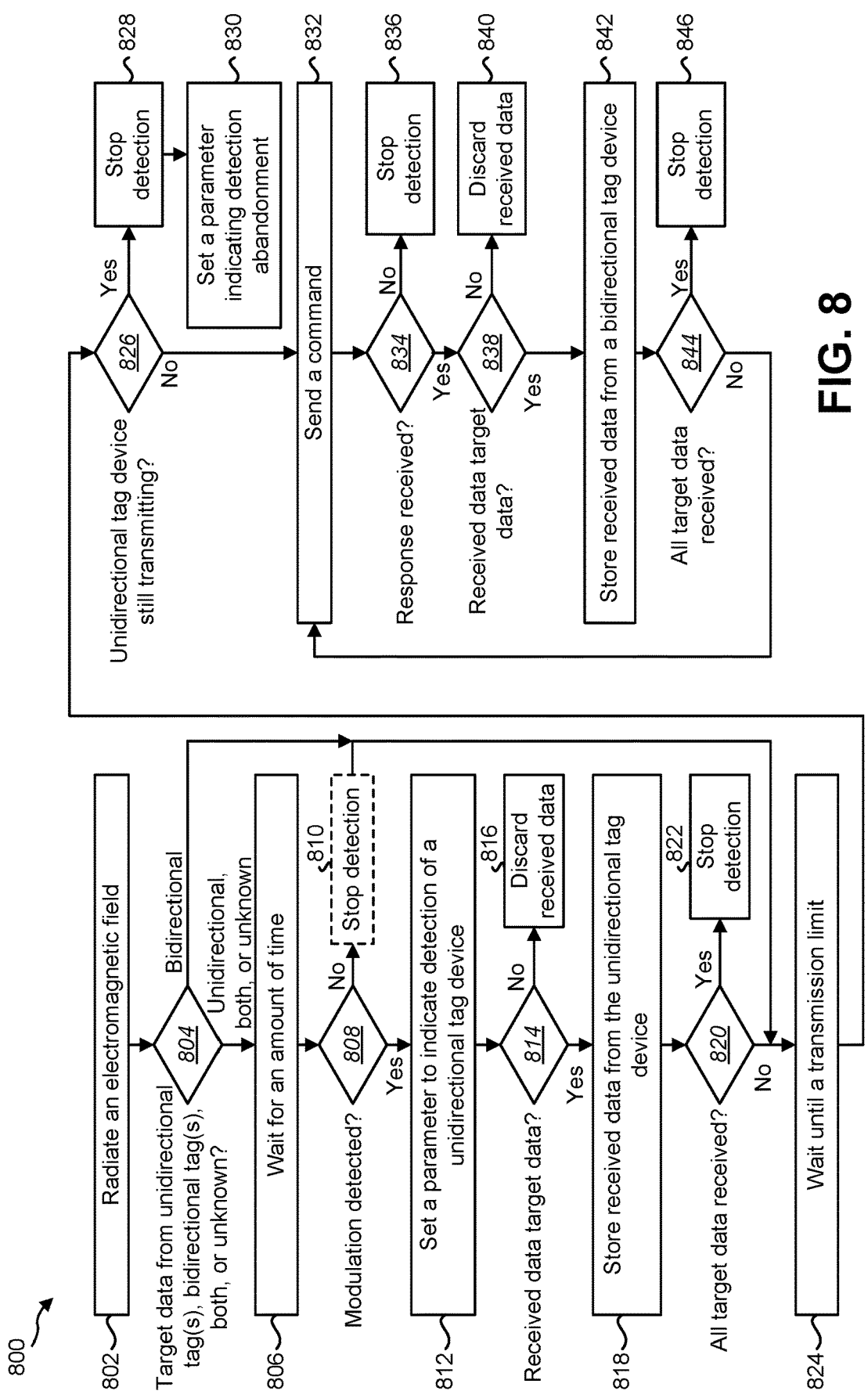
FIG. 8 is a flow diagram illustrating an example of another configuration of a method for coexistence operation.

FIG. 8 is a flow diagram illustrating an example of another configuration of a method 800 for coexistence operation. In some configurations, the method 800 may be performed by the reader/writer device 102 described in connection with FIG. 1 and/or the communication device 250 described in connection with FIG. 2. The reader/writer device 102 may radiate 802 an electromagnetic field. A unidirectional tag device and one or more bidirectional tag devices may be exposed to the electromagnetic field (e.g., may be energized by the electromagnetic field, may be within an operating volume of the electromagnetic field).

The reader/writer device 102 may determine 804 whether target data is from a unidirectional tag, a bidirectional tag, both, or unknown. This determination 804 may be one example of a determination of whether to perform discovery for unidirectional tag(s). Target data may be a type of data that is sought (by a communication device, by a reader/writer device, by an application, etc.). Examples of target data may include financial data (e.g., data for performing financial transactions), security data (e.g., data for authorizing entry, device access, information access, etc.), inventory data (e.g., product data), linking data (e.g., website address data), media data (e.g., audio data, video data, game data, etc.), personal data (e.g., business card data, contact information, etc.), device configuration data (e.g., data to connect to a wireless network), etc. In some configurations, determining 804 the target data source may be based on a setting. In some approaches, a setting may specify a target data source type (e.g., unidirectional tag, bidirectional tag, or both), target data format (e.g., data length, number of fields of the target data, one or more fields of the target data type, and/or data type such as text data, numeric data, audio data, video data, etc.), target data coding, etc. For example, the reader/writer device 102 may read a portion of memory that designates whether the target data is from a unidirectional tag, a bidirectional tag, or both. In some configurations, the setting may be set by an application. For example, an application that is currently in use (e.g., a payment application, a scanning application, etc.) on the reader/writer device 102 may write a setting to memory that indicates whether target data for the application may be sourced from a unidirectional tag, a bidirectional tag, or both. In some configurations, the reader/writer device 102 may receive (via an input device and/or a user interface) an indicator of a setting value. For example, a user may or may not want the reader/writer device 102 to perform unidirectional tag discovery and/or bidirectional tag discovery and may input the indicator (e.g., via a touchscreen, mouse, keypad, keyboard, button, microphone, etc.).

In some configurations, the reader/writer device 102 may additionally or alternatively determine whether the target data is from a unidirectional tag, a bidirectional tag, both, or whether it is unknown based on an operating context. For example, if the reader/writer device 102 is currently running an inventory scanning application that is only applicable to unidirectional tags, then the reader/writer device 102 may determine 804 to perform discovery only for unidirectional tag(s). In another example, if the reader/writer device 102 is currently running a payment application that is only applicable to bidirectional tags, the reader/writer device 102 may determine 804 not to perform discovery of unidirectional tags (e.g., only discovery of bidirectional tags). In some examples, the reader/writer device 102 may have an operational context in which both unidirectional and bidirectional tags may be discovered and/or in which it is unknown whether discovery of unidirectional or bidirectional tags is applicable. For example, an application may indicate that target data is needed via NFC detection but may not specify the type of tag as a source. In some approaches, the reader/writer device 102 may determine 804 to perform discovery for unidirectional tag(s) in the cases in which it is unknown whether unidirectional tag discovery is applicable or in which both unidirectional tag discovery and bidirectional tag discovery are applicable.

In a case that the reader/writer device 102 determines 804 that the target data is from a bidirectional tag(s) only, the reader/writer device 102 may proceed to perform operations for bidirectional tag detection. This may be accomplished as described above.

In a case that the reader/writer device 102 determines 804 that the target data is from a unidirectional tag, from both a bidirectional tag and a unidirectional tag or that the source is unknown, the reader/writer device 102 may wait 806 for an amount of time. This may be accomplished as described above.

The reader/writer device 102 may determine 808 whether modulation is detected. For example, the reader/writer device 102 may determine 808 whether the electromagnetic field has been modulated in order to receive data. This may be accomplished as described above. In some configurations, the reader/writer device 102 may perform modulation detection for a unidirectional tag during a guard time for a bidirectional tag. In a case that no modulation is detected, the reader/writer device 102 may proceed to bidirectional tag device discovery and/or detection. For example, the reader/writer device 102 may skip one or more operations related to unidirectional tag detection and/or data storage. In some approaches, if no modulation is detected, the reader/writer device 102 may set a parameter indicating that no unidirectional tag was detected and/or that no unidirectional tag data was received. In a case that the target data was only from a unidirectional tag, the reader/writer device 102 may stop 810 detection.

In a case that modulation is detected (e.g., data is received from a unidirectional tag device), the reader/writer device 102 may set 812 a parameter to indicate detection of a unidirectional tag device. In some examples, the parameter may indicate to a higher layer process and/or an application that a unidirectional tag device was detected and/or that data was successfully received from the unidirectional tag device.

The reader/writer device 102 may determine 814 whether the received data is target data. For example, the reader/writer device 102 may determine 814 whether the received data is compatible with or matches the target data format and/or target data coding, which may be indicating by a setting. For instance, the reader/writer may determine whether the data type the received data is the same type as the target data. If the received data is compatible with and/or matches the target data format and/or target data coding, the received data may be determined 814 to be target data. If the received data is not compatible with or does not match the target data format and/or target data coding, the received data may be determined 814 to not be target data. In a case that the received data is not target data, the reader/writer device 102 may discard 816 the received data.

In a case that the received data is target data, the reader/writer device 102 may store 818 received data from the unidirectional tag device. For example, the reader/writer device 102 may write the received data from the unidirectional tag device to memory (e.g., RAM, magnetic disk, flash memory, optical disc, etc.). In some configurations, the reader/writer device 102 may present the received data (or other information based on the received data) on a display.

The reader/writer device 102 may determine 820 whether all target data is received. For example, the reader/writer device 102 may determine 820 whether the received data satisfies a request from an application requesting the data. In a case that all of the target data is received, the reader/writer device 102 may stop 822 detection. For example, in a case that the target data source type (e.g., unidirectional tag or bidirectional tag) is unknown, if receiving data from the unidirectional tag is sufficient, then no additional detection from a bidirectional device may be necessary.

In a case that all target data is not received, the reader/writer device 102 may wait 824 until a transmission limit. This may be accomplished as described above.

The reader/writer device 102 may determine 826 whether a unidirectional tag device is still transmitting. This may be accomplished as described above. In a case that the unidirectional tag device is still transmitting, the reader/writer device 102 may stop 828 detection. This may be accomplished as described in connection with FIG. 7. The reader/writer device 102 may set 830 a parameter indicating detection abandonment. The parameter may be utilized to indicate (to an application, for example), that further detection is abandoned (due to interference, for instance).

In a case that the unidirectional device is not still transmitting, the reader/writer device 102 may send 832 a command. This may be accomplished as described in connection with FIG. 7.

The reader/writer device 102 may determine 834 whether a response is received. This may be accomplished as described in connection with FIG. 7. In a case that no response is received, the reader/writer device 102 may stop 836 detection. This may be accomplished as described in connection with FIG. 7.

The reader/writer device 102 may determine 838 whether the received data is target data. For example, the reader/writer device 102 may determine 838 whether the type of data received is the same type as the target data. In a case that the received data is not target data, the reader/writer device 102 may discard 840 the received data. In some configurations, the reader/writer device 102 may return to perform further bidirectional tag detection to receive target data.

In a case that the received data is target data, the reader/writer device 102 may store 842 the received data from a bidirectional tag device. This may be accomplished as described above in connection with FIG. 7. In some configurations, the reader/writer device 102 may present the received data (or other information based on the received data) on a display. The unidirectional tag device and the bidirectional tag device may be exposed to (e.g., within the operating volume of) the electromagnetic field when the data from the bidirectional tag device is received.

The reader/writer device 102 may determine 844 whether all target data is received. For example, the reader/writer device 102 may determine 820 whether the received data satisfies a request from an application requesting the data. In a case that all of the target data is received, the reader/writer device 102 may stop 846 detection. In a case that not all target data is received, the reader/writer device 102 may return to perform further bidirectional tag detection (e.g., return to sending 832 a command for another bidirectional tag device).

Figure 9:
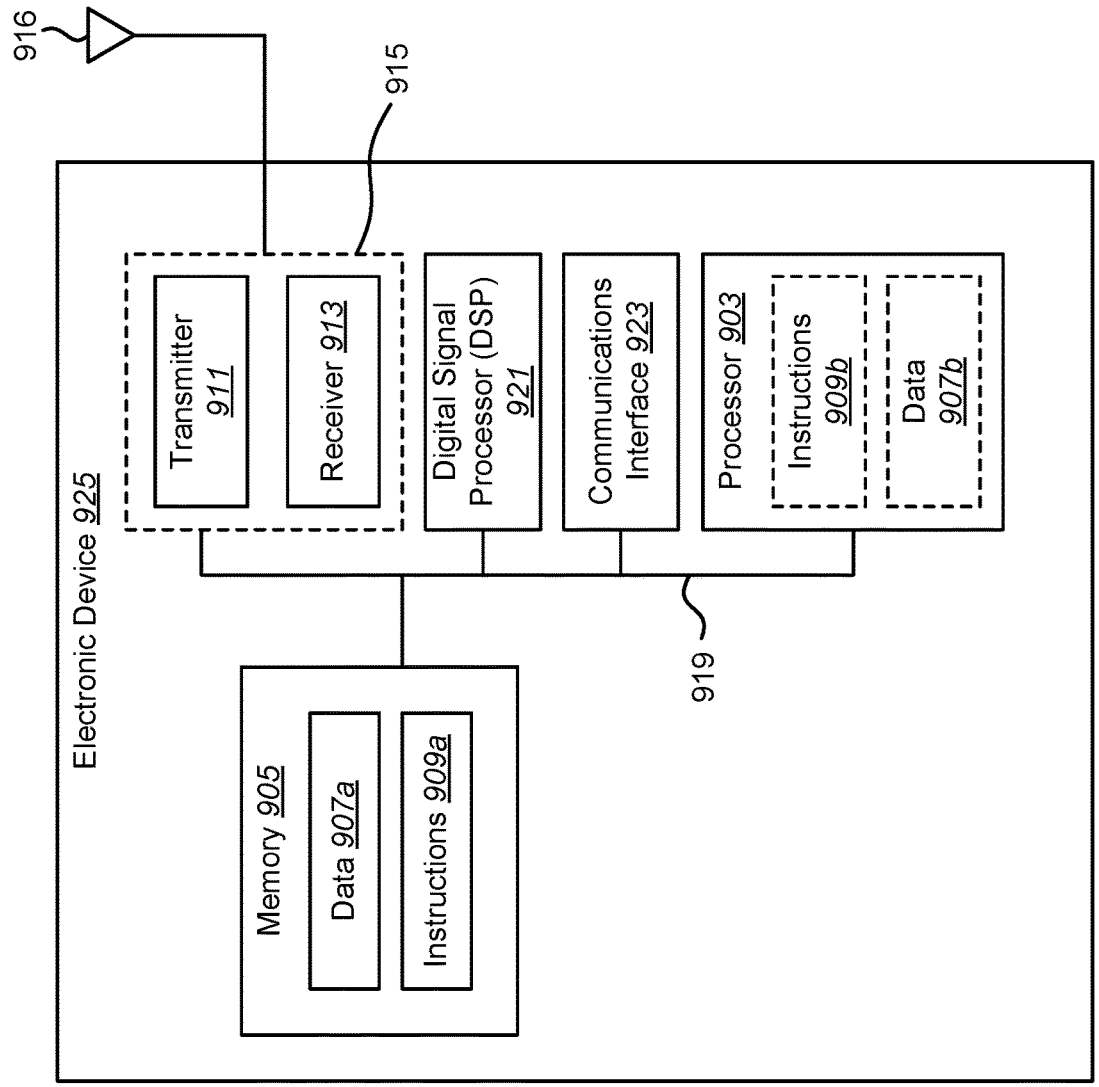
FIG. 9 illustrates certain components that may be included within an electronic device.

FIG. 9 illustrates certain components that may be included within an electronic device 925. In some examples, the electronic device 925 may be the reader/writer device 102, the communication device 250 or the bidirectional tag device 274 described herein.

The electronic device 925 includes a processor 903. The processor 903 may be a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 903 may be referred to as a central processing unit (CPU). Although just a single processor 903 is shown in the electronic device 925 of FIG. 9, in an alternative configuration, a combination of processors (e.g., an ARM and DSP) could be used.

The electronic device 925 also includes memory 905 in electronic communication with the processor (i.e., the processor can read information from and/or write information to the memory). The memory 905 may be any electronic component capable of storing electronic information. The memory 905 may be configured as random access memory (RAM), read-only memory (ROM), magnetic disk storage media, optical storage media, flash memory devices in RAM, on-board memory included with the processor, EPROM memory, EEPROM memory, registers, and so forth, including combinations thereof.

Data 907a and instructions 909a may be stored in the memory 905. The instructions may include one or more programs, routines, sub-routines, functions, procedures, code, etc. The instructions may include a single computer-readable statement or many computer-readable statements. The instructions 909a may be executable by the processor 903 to implement the methods disclosed herein. Executing the instructions 909a may involve the use of the data 907a that is stored in the memory 905. When the processor 903 executes the instructions 909a, various portions of the instructions 909b may be loaded onto the processor 903, and various pieces of data 907b may be loaded onto the processor 903.

The electronic device 925 may also include a transmitter 911 and a receiver 913 to allow transmission and reception of signals to and from the electronic device 925 via an antenna 916. The transmitter 911 and receiver 913 may be collectively referred to as a transceiver 915. The electronic device 925 may also include (not shown) multiple transmitters, multiple antennas, multiple receivers and/or multiple transceivers.

The electronic device 925 may include a digital signal processor (DSP) 921. The electronic device 925 may also include a communications interface 923. The communications interface 923 may allow a user to interact with the electronic device 925.

The various components of the electronic device 925 may be coupled together by one or more buses, which may include a power bus, a control signal bus, a status signal bus, a data bus, etc. For the sake of clarity, the various buses are illustrated in FIG. 9 as a bus system 919.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a digital signal processor (DSP) and a microprocessor, a plurality of microprocessors, one or more microprocessors in conjunction with a digital signal processor (DSP) core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may include RAM, ROM, EEPROM, compact disc read-only memory (CD-ROM) or other optical disk storage, magnetic disk storage or other magnetic storage devices, or any other medium that can be used to carry or store program code in the form of instructions or data structures and that can be accessed by a computer. Disk and disc, as used herein, includes compact disc (CD), laser disc, optical disc, digital versatile disc (DVD), floppy disk, and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed, or computed by the computing device or processor. As used herein, the term "code" may refer to software, instructions, code, or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that in some configurations, modules and/or other appropriate means for performing the methods and techniques described herein may be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the systems, methods, and apparatus described herein without departing from the scope of the claims.

What is claimed is:

1. A near-field communication (NFC) device, comprising:
   an antenna configured to radiate an electromagnetic field; and
   electronic circuitry coupled to the antenna, wherein the electronic circuitry is configured to:
     receive first data from a unidirectional tag device,
     determine the unidirectional tag device has ceased performing any transmission upon receiving a threshold number of transmissions from the unidirectional tag device,
     send a command in response to the determination, and
     receive second data from at least one bidirectional tag device after sending the command.

2. The NFC device of claim 1, wherein the NFC device is a reader/writer device.

3. The NFC device of claim 1, wherein the threshold number of transmissions are received in a threshold period of time that is less than or equal to a guard time of the NFC device.

4. The NFC device of claim 1, wherein the electronic circuitry is configured to perform modulation detection for the unidirectional tag device during a guard time for the at least one bidirectional tag device.

5. The NFC device of claim 1, wherein the electronic circuitry is configured to:
   determine whether the received first data from the unidirectional tag device is target data; and
   discard the received first data from the unidirectional tag device in response to determining that the received first data from the unidirectional tag device is not target data.

6. A method performed by a near-field communication (NFC) device, the method comprising:
   radiating an electromagnetic field;
   receiving first data from a unidirectional tag device;
   determining the unidirectional tag device has ceased performing any transmission upon receiving a threshold number of transmissions from the unidirectional tag device;
   sending a command in response to the determination; and
   receiving second data from at least one bidirectional tag device after sending the command.

7. The method of claim 6, wherein the NFC device is a reader/writer device.

8. The method of claim 6, wherein the threshold number is based on a threshold period of time that is less than or equal to a guard time of the NFC device.

9. The method of claim 6, further comprising performing modulation detection for the unidirectional tag device during a guard time for the bidirectional tag device.

10. The method of claim 6, further comprising:
    determining whether the received first data from the unidirectional tag device is target data; and
    discarding the received first data from the unidirectional tag device in response to determining that the received first data from the unidirectional tag device is not target data.

11. A non-transitory tangible computer-readable medium storing computer executable code, comprising:
    code for causing an electronic device to radiate an electromagnetic field;
    code for causing the electronic device to receive first data from a unidirectional tag device;
    code for determining the unidirectional tag device has ceased performing any transmission upon receiving a threshold number of transmissions from the unidirectional tag device;
    code for sending a command in response to the determination; and
    code for causing the electronic device to receive second data from a bidirectional tag device after sending the command.

12. The computer-readable medium of claim 11, further comprising code for causing the electronic device to perform modulation detection for the unidirectional tag device during a guard time for the bidirectional tag device.

13. An apparatus, comprising:
    means for radiating an electromagnetic field;
    means for receiving first data from a unidirectional tag device;
    means for determining the unidirectional tag device has ceased performing any transmission upon receiving a threshold number of transmissions from the unidirectional tag device;
    means for sending a command in response to the determination; and
    means for receiving second data from a bidirectional tag device after sending the command.

14. The apparatus of claim 13, further comprising means for performing modulation detection for the unidirectional tag device during a guard time for the bidirectional tag device.

* * * * *